US010024379B2

(12) United States Patent
Schmidt et al.

(10) Patent No.: US 10,024,379 B2
(45) Date of Patent: Jul. 17, 2018

(54) HYDRAULIC SHOCK ABSORBER

(71) Applicant: SAFRAN LANDING SYSTEMS UK LTD, Gloucester, Gloucestershire (GB)

(72) Inventors: Robert Kyle Schmidt, Gloucester (GB); Matthew Baxter, Gloucester (GB)

(73) Assignee: Safran Landing Systems UK LTD (GB)

( * ) Notice: Subject to any disclaimer, the term of this patent is extended or adjusted under 35 U.S.C. 154(b) by 0 days.

(21) Appl. No.: 15/093,078

(22) Filed: Apr. 7, 2016

(65) Prior Publication Data
US 2016/0298714 A1  Oct. 13, 2016

(30) Foreign Application Priority Data

Apr. 10, 2015  (EP) .................................... 15163172

(51) Int. Cl.
*F16F 9/36* (2006.01)
*B64C 25/60* (2006.01)
*F16J 15/40* (2006.01)

(52) U.S. Cl.
CPC ................ *F16F 9/36* (2013.01); *B64C 25/60* (2013.01); *F16J 15/403* (2013.01); *F16F 2224/043* (2013.01); *F16F 2224/045* (2013.01)

(58) Field of Classification Search
CPC .... F16F 9/53; F16F 9/532; F16F 9/535; F16F 9/36; F16F 2224/043; F16F 2224/045;
(Continued)

(56) References Cited

U.S. PATENT DOCUMENTS 7,303,056 B2   12/2007  Namuduri
8,757,335 B2 *  6/2014  Kaneda ................... D06F 37/20
                                              188/267
(Continued)

FOREIGN PATENT DOCUMENTS

CN        202040263        11/2011
CN        102913587         2/2013
(Continued)

OTHER PUBLICATIONS

Extended European Search Report dated Oct. 19, 2015 for Application No. 15163172.8-1755, 6 pages.

*Primary Examiner* — Anna M Momper
(74) *Attorney, Agent, or Firm* — RatnerPrestia

(57) ABSTRACT

A hydraulic shock absorber having an inner housing portion slidably coupled to an outer housing portion to define a variable size chamber for containing shock absorber fluid. The region where the inner and outer housing portions overlap defines an annulus between adjacent surfaces of the inner and outer housing portions which varies in size in accordance with the extension state of the shock absorber. A dynamic seal is coupled to a surface of the shock absorber within the annulus for confining shock absorber fluid to the chamber. The shock absorber fluid is an electro-rheological or magneto-rheological fluid and the shock absorber includes a device for generating a magnetic or electric control field within the chamber at a region adjacent dynamic seal in order to increase the viscosity of the shock absorber fluid adjacent to the dynamic seal to inhibit passage of the shock absorber fluid beyond the dynamic seal.

17 Claims, 4 Drawing Sheets

(58) Field of Classification Search
CPC ... Y10S 277/919; Y10S 277/92; F16J 15/403; B64C 25/60; B64C 25/62
See application file for complete search history.

(56) References Cited

U.S. PATENT DOCUMENTS

| | | |
|---|---|---|
| 2001/0048049 A1 | 12/2001 | Carter, Jr. |
| 2002/0092721 A1* | 7/2002 | Oliver .................... F16F 9/535 188/267.2 |
| 2005/0087410 A1 | 4/2005 | Namuduri |
| 2008/0023278 A1 | 1/2008 | Wereley |
| 2009/0242340 A1 | 10/2009 | Hadley |
| 2009/0277733 A1 | 11/2009 | Doffing |
| 2011/0133378 A1* | 6/2011 | Dunn .................... B64C 25/52 267/217 |
| 2011/0309192 A1 | 12/2011 | Luce |
| 2012/0292143 A1 | 11/2012 | Anderfaas |
| 2012/0312260 A1 | 12/2012 | Oka |
| 2014/0076676 A1 | 3/2014 | Nehl |

FOREIGN PATENT DOCUMENTS

| | | | |
|---|---|---|---|
| CN | 103195858 | 7/2013 | |
| CN | 203374727 | 1/2014 | |
| CN | 103758913 | 4/2014 | |
| CN | 103939517 | 7/2014 | |
| CN | 203685963 | 7/2014 | |
| EP | 1925861 | 5/2008 | |
| JP | 59006448 A * | 1/1984 | ............... F16F 9/36 |
| JP | 2012061228 | 3/2012 | |

* cited by examiner

HYDRAULIC SHOCK ABSORBER

This application claims the benefit of and priority to European Application 15163172.8, filed Apr. 10, 2015, the contents of which are incorporated herein by reference.

BACKGROUND TO THE INVENTION

It is common for a hydraulic shock absorber to include an inner housing portion which is slidably coupled to an outer housing portion such that the effective length of the shock absorber is variable. The inner and outer housing portions together define an internal cavity or chamber, which contains shock absorber fluid. The inner housing portion is known in the art as a 'slider', 'sliding tube', 'inner cylinder', or 'piston', and the outer housing portion is known as a 'main fitting', or 'outer cylinder'.

The region where the inner and outer housing portions overlap defines an annulus between adjacent surfaces of the inner and outer housing portions, which varies in size in accordance with the extension state of the shock absorber.

One or more dynamic seals are generally provided within the annulus to confine the shock absorber fluid to the chamber. The dynamic seals can be mounted on an inner face of an annular ring, which is inserted into and fixed in place within the annulus such that the dynamic seals press against the inner housing portion as the shock absorber extends and retracts, inhibiting the passage of shock absorber fluid from the chamber to the outside environment. One or more static seals can be provided on an outer face of the annular ring to bear against the outer housing portion when the annular ring is fitted within the annulus.

The effectiveness of a dynamic seal in terms of inhibiting the passage of shock absorber fluid is dependent on the force with which it is biased against the inner shock absorber portion. However, a strong biasing force results in a high level of wear. Therefore, there exists a trade-off between on the one hand the effectiveness of the fluid barrier and on the other hand the lifespan of the dynamic seal. Consequently, it is common for shock absorber fluid to leak via dynamic seals, particularly when a shock absorber remains in a static condition for a prolonged period to time.

SUMMARY OF INVENTION

According to a first aspect of the invention there is provided a hydraulic shock absorber comprising:
  an inner housing portion slidably coupled to an outer housing portion to define a variable size chamber for containing shock absorber fluid, the region where the inner and outer housing portions overlap defining an annulus between adjacent surfaces of the inner and outer housing portions which varies in size in accordance with the extension state of the shock absorber; and
  one or more seals located within the annulus and arranged in contact with one of the inner and outer housing portions for confining shock absorber fluid to the chamber,
characterised in that:
  the shock absorber fluid comprises an electro-rheological or magneto-rheological liquid and the shock absorber includes a device for generating a magnetic or electric control field in the region or regions of the one or more seals to increase the viscosity of the shock absorber fluid to inhibit passage of the shock absorber fluid beyond the seals.

Thus, the shock absorber according to the first aspect of the invention enables the viscosity of the shock absorber fluid in the region of the seal to be increased so as to turn the fluid from a liquid with relatively low viscosity to a gel with relatively high viscosity. The high viscosity fluid near the seal can inhibit leakage past the seals.

At least one of the seals can be a dynamic seal arranged in contact with the inner housing portion. Advantageously, the high viscosity fluid near the dynamic seal means that the biasing force for the seal can be lower than know arrangements, thereby improving the lifespan of the seal.

The field defining device can be arranged such that the intensity of the magnetic field or electric field defined within the chamber is greater in the region of the dynamic seal relative to a region encompassing one or more damping orifices.

The control field can be localised at the seal such that the normal damping characteristics of the shock absorber are substantially unaffected by the control field.

The field defining device can be mounted externally with respect to the shock absorber. This enables existing shock absorbers to be modified to incorporate features of the invention.

Alternatively, the field defining device can be formed as part of the circumferential wall of the outer housing portion, or in some embodiments can be mounted within the annulus. This can reduce the likelihood of the outer housing portion adversely affecting the generated field in use.

Where the shock absorber fluid is an electro-rheological fluid, the field defining device can be any suitable device for generating an electrostatic or electro-dynamic field. In one example, a pair of annular electrodes are positioned in parallel within the annulus, with one electrode adjacent to the seal. By driving a potential difference (PD) to the electrode plates, the fluid properties in the region between the electrodes can be controlled. Field strengths of up to 5000 V can be used. A controller can be provided to apply the PD to the electrodes when required, which can be just when the shock absorber is at rest.

Where the shock absorber fluid is a magneto-rheological fluid, the field defining device can comprise an array of one or more permanent magnets. Permanent magnets provide a simple solution, and the inventor has found that a permanent magnetic field defined locally with respect to the dynamic seal adversely affects the normal operation of the shock absorber within acceptable limits.

Alternatively, the field defining device can consist of electromagnets. This enables the electromagnets to be controlled so as to be active only when the shock absorber is static, such that there is no high viscosity 'clumped' shock absorber fluid in the region of the dynamic seal to affect normal operation of the seal. As such, the shock absorber fluid can be substantially unaffected by the magnetic field when the shock absorber is in use, during which time the dynamic seal is relatively effective at confining shock absorber fluid to the chamber in comparison to its effectiveness when the shock absorber is static.

Alternatively, the field defining device can comprise an array of permanent magnets and electromagnets, the electromagnets being arranged to substantially cancel the magnetic field defined by the permanent magnets when energised. As such, the electromagnets can be energised when the shock absorber is in use, and de-energised when the shock absorber is in a static condition to improve sealing. Such embodiments have the advantage of only requiring the electromagnets to be powered when the shock absorber is in use.

According to a second aspect of the invention there is provided an aircraft landing gear assembly including a shock absorber according to the first aspect.

According to a third aspect of the invention there is provided an aircraft assembly including one or more shock absorbers according to the first aspect or one or more aircraft landing gear assemblies according to the second aspect.

According to a fourth aspect of the invention, there is provided a method of preventing leaking of shock absorber fluid from a shock absorber according to the first aspect, comprising the steps of:

applying a control field to a shock absorber containing shock absorber fluid which is an electro-rheological or magneto-rheological fluid in order to increase the viscosity of the shock absorber fluid adjacent to a seal, which can be a dynamic seal, within the shock absorber to inhibit passage of the shock absorber fluid beyond the seal.

The control field can be applied only when the shock absorber is in a static condition, by activating a field generation device to define the control field or deactivating a field generation device to reduce destructive interference with a co-located permanent field generating device.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
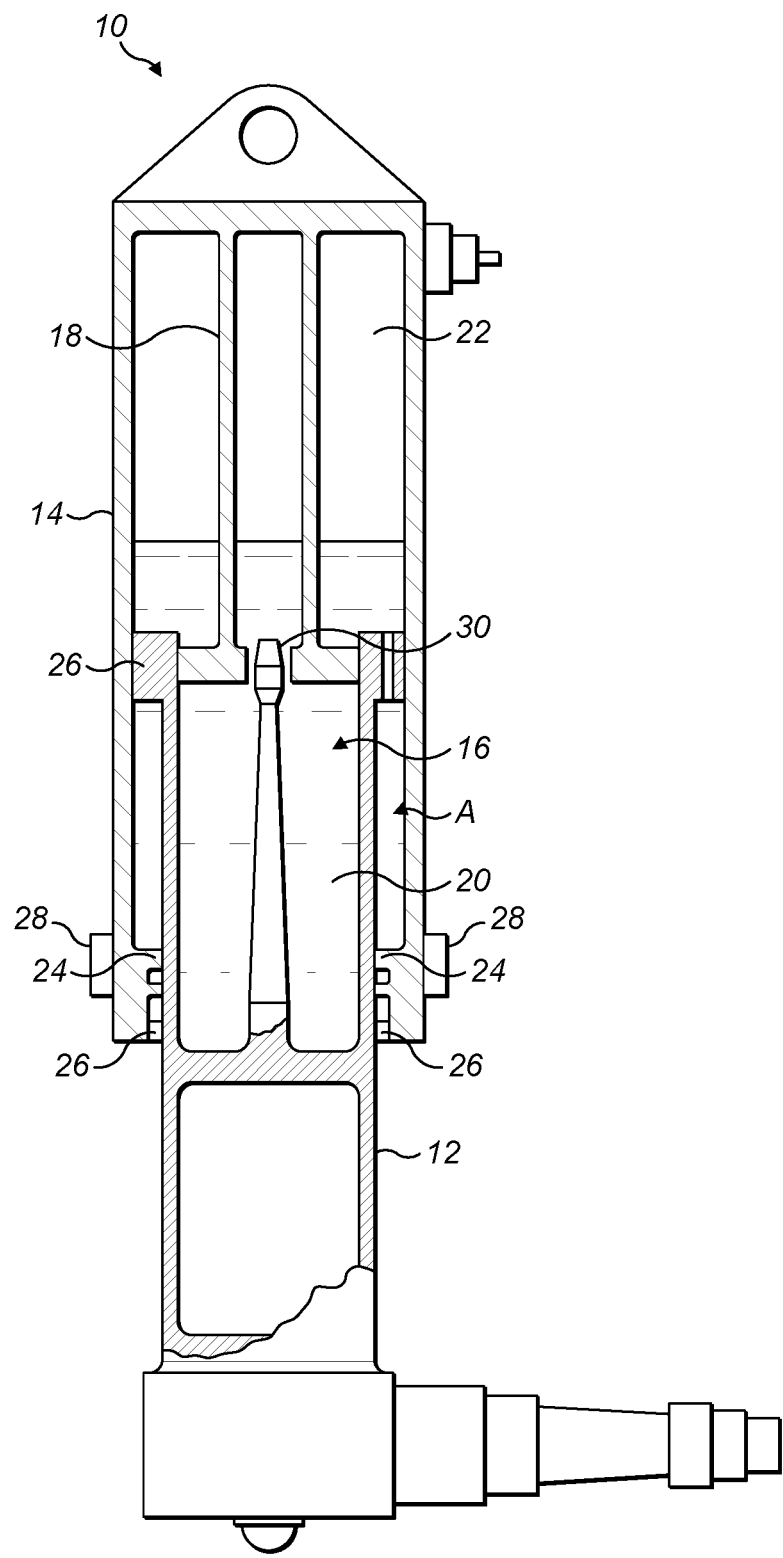
FIG. 1 is a schematic representation of an oleo-pneumatic shock absorber according to an embodiment of the invention.

Referring first to FIG. 1, an aircraft landing gear assembly comprising an oleo-pneumatic shock absorber is shown generally at 10. The shock absorber 10 forms the main strut of the aircraft landing gear.

The shock absorber comprises an inner housing portion 12, slidably coupled in an outer housing portion 14 via bearings 26. The housing portions 12, 14 together define an internal cavity or chamber 16 which contains shock absorber fluid. In the illustrated embodiment the chamber 16 contains oil 20 in a lower portion thereof and gas 22 in an upper portion thereof. The oil 20 and gas 22 together make up the shock absorber fluid.

The region where the housing portions 12, 14 overlap defines an annulus A between adjacent surfaces of the housing portions 12, 14. The annulus A varies in size in accordance with the extension state of the shock absorber 10.

A dynamic seal 24 is mounted within the annulus A for confining shock absorber fluid to the chamber 16. The dynamic seal 24 enables the inner housing portion 12 to slide within the outer housing portion 14 with limited leakage of the shock absorber fluid from the chamber 16. Thus, the chamber 16 defines a sealed fluid volume for containing the shock absorber fluid.

When a load is applied to the shock absorber 10, the inner housing portion 12 slides into the outer housing portion 14 and the shock absorber 10 is compressed, reducing the volume of the chamber 16. This causes compression of the gas 22 inside the internal chamber 16. When a load is removed from the shock absorber 10 the internal pressure of the shock absorber fluid causes the inner housing portion 12 to slide out of the outer housing portion 14 so that the shock absorber 10 expands. During compression and extension of the shock absorber, oil 20 is forced through an orifice 30 to provide viscous damping.

The shock absorber fluid is an electro-rheological fluid or a magneto-rheological fluid. As will be appreciated by the skilled person, an electro-rheological fluid includes small non-conducting particles suspended in an electrically insulating carrier fluid, the viscosity of which can be modified by an applied electric field. Likewise, a magneto-rheological fluid includes small magnetic particles suspended in a carrier fluid such as oil; the viscosity of a magneto-rheological fluid can be modified by an applied magnetic field. In either case, an appropriate field can be applied to change the fluid from a liquid state to a gel or solid state. Any suitable fluid can be used, such as MRF-132DG magneto-rheological fluid produce by Lord Corporation.

Figure 2:
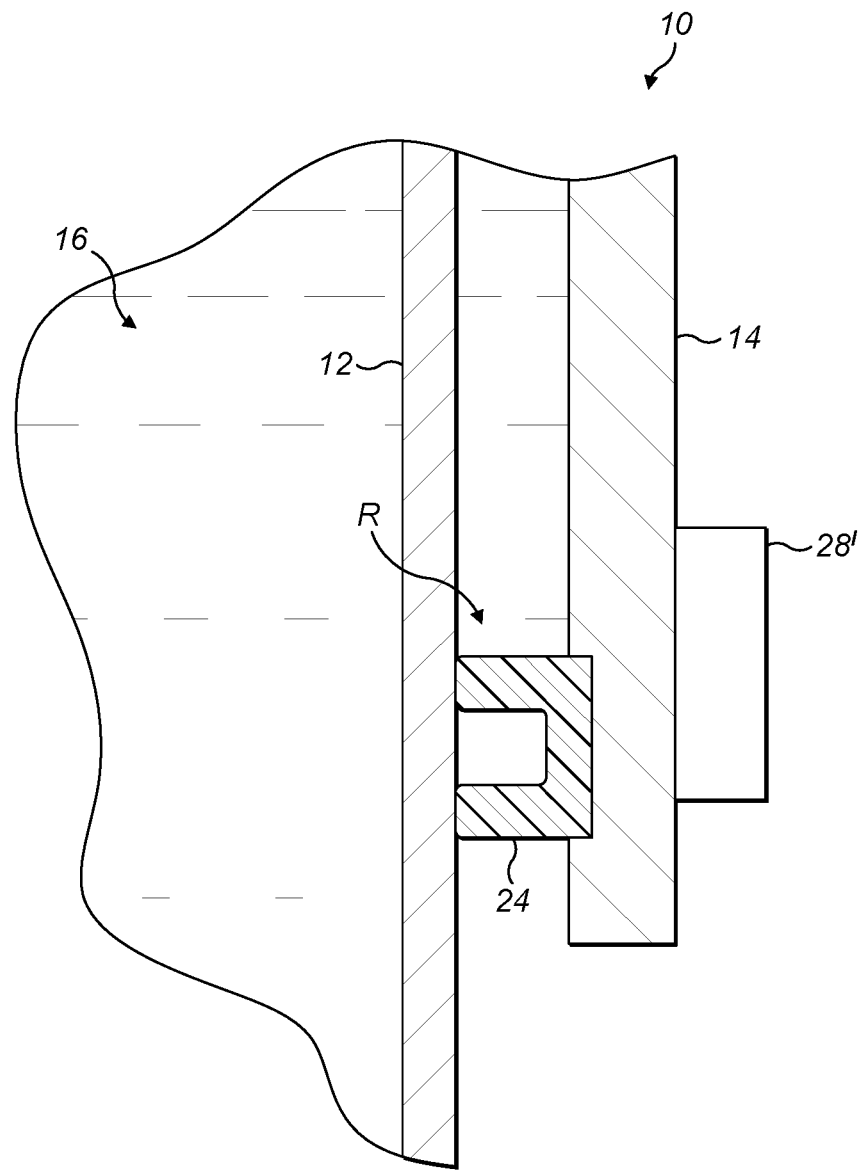
FIG. 2 is a schematic representation of the shock absorber of FIG. 1 focusing on the region of the seal.

Referring additionally to FIG. 2, the shock absorber 10 includes a device 28 for generating a control field in the region R of the dynamic seal 24a. Depending on the nature of the shock absorber fluid, the control field can be a magnetic field or an electric field. The purpose of the field generating device 28 is to enable the viscosity of the shock absorber fluid in the region R of the dynamic seals 24 to be increased relative to another region of the chamber 16 in order to inhibit shock absorber fluid leaking through the dynamic seal 24. In other embodiments the field defining device 28 can be arranged to define a control field in the region of a plurality of seals, at last some of which can be dynamic; for example, if the dynamic seal is mounted on an inner face of a conventional annular insert ring, the static seal(s) provided on the outer face can also be targeted by the control field.

In the illustrated embodiment the field defining device 28 is mounted externally with respect to the shock absorber 10 on an outer face of the outer housing portion 14 in general alignment with the region R adjacent to the seal 24. This enables existing shock absorbers to be modified to incorporate features of the invention. In such embodiments the wall outer housing portion 14 should be configured to permit the appropriate magnetic flux to transmit through the wall; for example, aluminium or composite walls permit this transfer.

Alternatively, the field defining device can be formed as part of the circumferential wall of the outer housing portion 14, or in some embodiments can be mounted within the annulus A. Such embodiments can reduce the likelihood of the outer housing portion 14 adversely affecting the generated field in use.

In the illustrated embodiment the shock absorber fluid is a magneto-rheological fluid and the field defining device 28 comprises an array of one or more permanent magnets 28 arranged in an annular ring to match the outer diameter of the outer housing portion 14. The field defining device 28 is arranged such that the intensity of the magnetic field defined within the chamber 16 is greatest in the region R of the dynamic seal 24. Permanent magnets provide a simple solution, and the inventor has found that the normal damping characteristics of the shock absorber 10 are substantially unaffected by the control field because the shock absorber fluid in the region of the internal damping orifices is substantially unaffected by the control field and therefore has a relatively low viscosity.

Alternatively, the field defining device 28 can consist of electromagnets. This enables the electromagnets to be controlled so as to be active only when the shock absorber 10 is static, such that there is no high viscosity 'clumped' shock absorber fluid in the region R of the dynamic seal 24 to affect normal operation of the seal 24. Such embodiments are also less sensitive to propagation of the control field towards the damping orifices.

Figure 3:
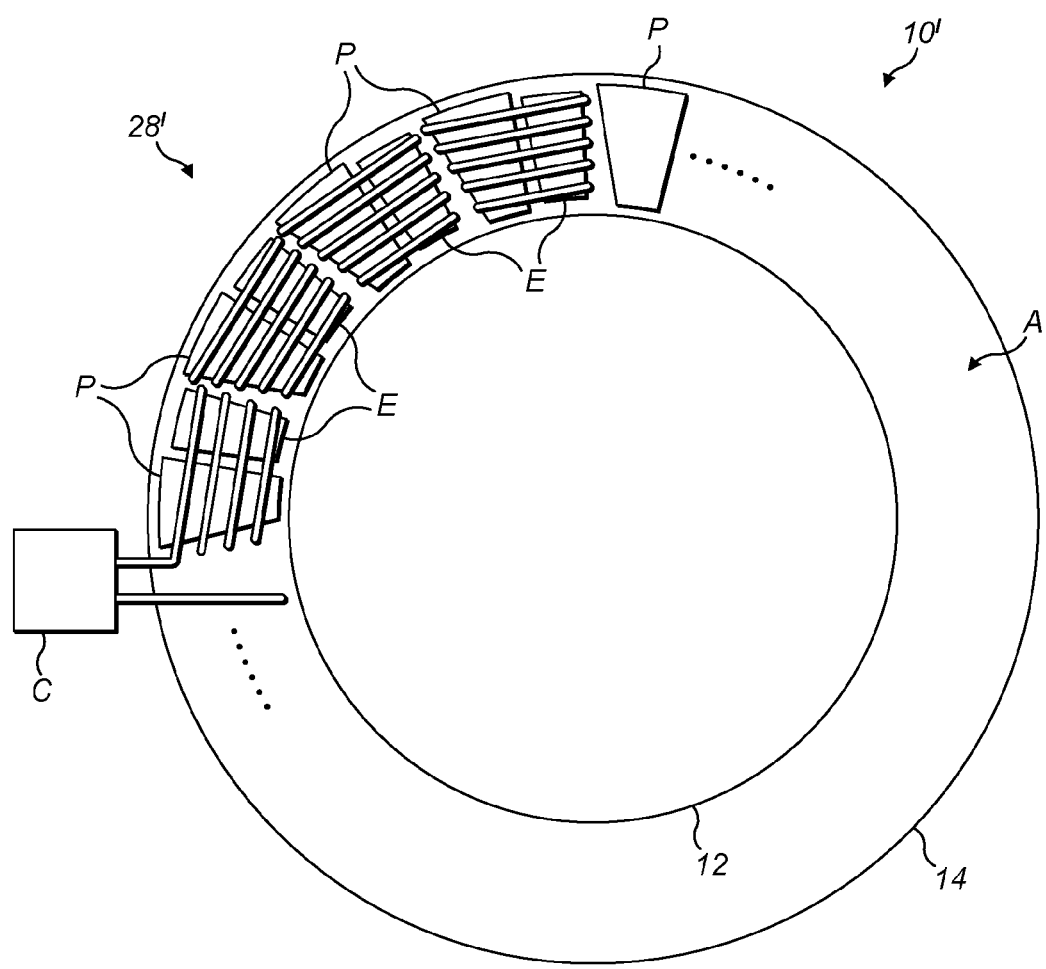
FIG. 3 is a schematic representation of a shock absorber according to a further embodiment of the invention.

Referring additionally to FIG. 3, in other embodiments the shock absorber 10' can include a field defining device 28' which comprises an array of permanent magnets P and electromagnets E. In the illustrated embodiment the series of magnets are arranged around the slider 12 within the annulus A. The permanent magnets can be formed from rare earth Neodymium (NdFeB). Interspersed with the NdFeB magnets P are a magnetically soft material around which energising coils are wound. The array can be arranged in magnet pairs of one electromagnet E and one permanent magnet P contained within an energising coil. The electromagnets E are together energised by a suitable controller C. When energised, the electromagnets E are arranged to substantially cancel the magnetic field defined by the permanent magnets P. The coils are preferentially wound and energised such that the magnetic field created by the electromagnets E substantially nulls the baseline magnetic field of the permanent magnets P, providing substantially no magnetisation to the magneto-rheological fluid in the region R of interest. As such, the electromagnets E can be energised when the shock absorber 10" is in use, and de-energised when the shock absorber 10 is in a static condition to improve sealing. Such embodiments have the advantage of only requiring the electromagnets E to be powered when the shock absorber 10 is in use.

Figure 4:
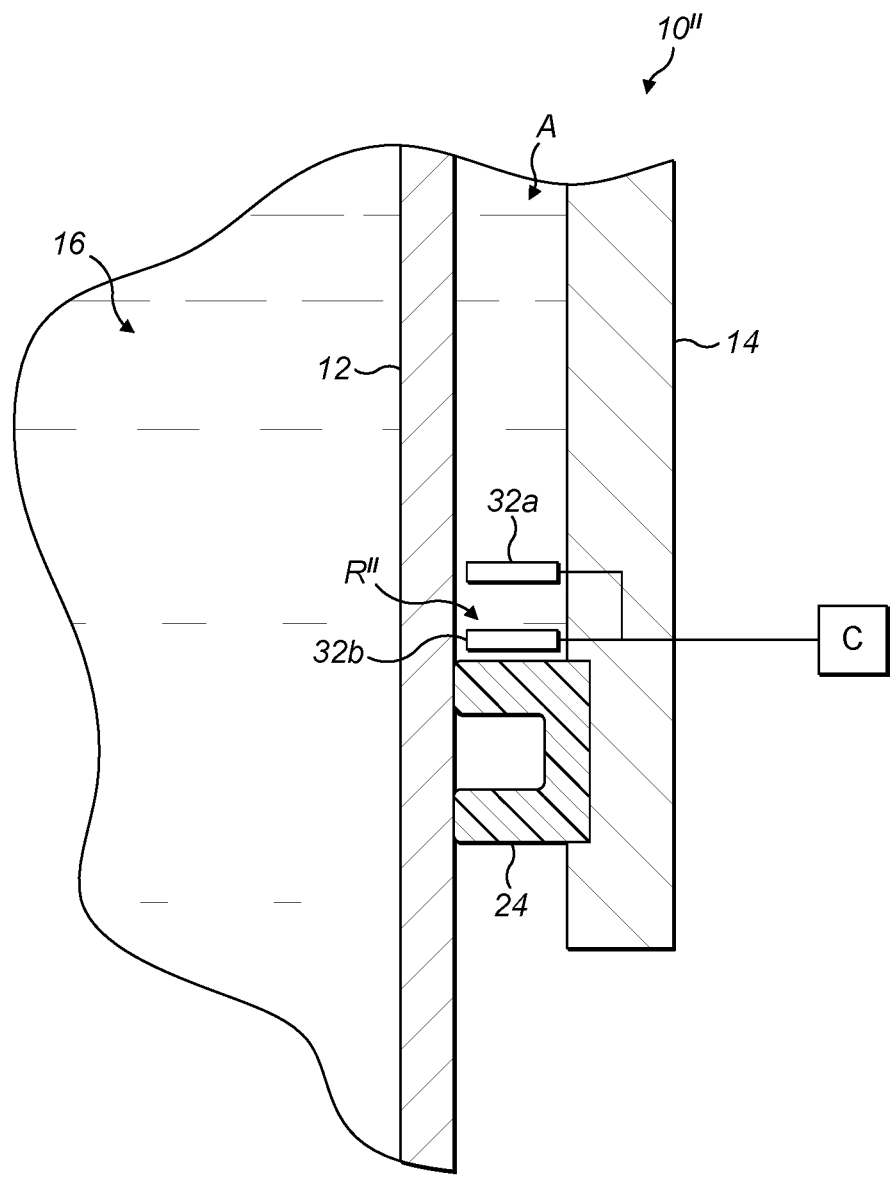
FIG. 4 is a schematic representation of a shock absorber according to a further embodiment of the invention.

Referring now to FIG. 4, in other embodiments the shock absorber 10" can contain electro-rheological shock absorber fluid, in which case the field defining device can comprise a pair of annular electrodes 32a, 32b positioned in parallel within the annulus A, with one electrode 32b adjacent to the seal 24. By driving a potential difference (PD) to the electrode plates, the fluid properties in the region R" between the electrodes 32a, 32b can be controlled. Field strengths of up to 5000 V can be used. A controller C can be provided to apply the PD to the electrodes 32a, 32b when required, which can be just when the shock absorber 10" is at rest.

Thus, the shock absorber according to embodiments of the invention enables the viscosity of the shock absorber fluid in the region of the dynamic seal to be increased in order to decrease the likelihood of the shock absorber fluid leaking through the dynamic seal substantially without affecting the damping characteristics of the shock absorber.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. A hydraulic shock absorber comprising:
    an inner housing portion slidably coupled to an outer housing portion to define a variable size chamber for containing shock absorber fluid, the region where the inner and outer housing portions overlap defining an annulus between adjacent surfaces of the inner and outer housing portions which varies in size in accordance with the extension state of the shock absorber; and
    a seal located within the annulus and arranged in contact with one of the inner and outer housing portions for confining shock absorber fluid to the chamber;
    wherein the shock absorber fluid comprises an electro-rheological or magneto-rheological liquid and the shock absorber includes a device for generating a magnetic or electric control field in the region of the seal in order to increase the viscosity of the shock absorber fluid such that the fluid in the region of the seal changes from a liquid state to a gel-like or solid state to inhibit passage of the shock absorber fluid beyond the seal; and
    wherein the control field is stronger in a region of the electro-rheological or magneto-rheological liquid relatively near the seal than in a region of the electro-rheological or magneto-rheological liquid relatively far from the seal.

2. The hydraulic shock absorber according to claim 1, wherein the seal is a dynamic seal arranged in contact with the inner housing portion.

3. The hydraulic shock absorber according to claim 1, wherein the field generating device is arranged such that the intensity of the magnetic field or electric field defined within the chamber is relatively high in the region of the seal and relatively low in a damping region of the shock absorber.

4. The hydraulic shock absorber according to claim 3, wherein the damping region of the shock absorber comprises a region of one or more damping orifices.

5. The hydraulic shock absorber according to claim 1, wherein the field generating device is arranged such that control field is localised in or substantially confined to the region of the dynamic seal.

6. The hydraulic shock absorber according to claim 1, wherein the field generating device is mounted within the annulus, adjacent to the seal.

7. The hydraulic shock absorber according to claim 1, wherein the field generating device is formed as part of the circumferential wall of the outer housing portion.

8. The hydraulic shock absorber according to claim 1, wherein the field generating device comprises an array of one or more permanent magnets.

9. The hydraulic shock absorber according to claim 1, wherein the field generating device comprises one or more electromagnets.

10. The hydraulic shock absorber according to claim 1, wherein the field generating device comprises an array of permanent magnets and electromagnets, the electromagnets being arranged to substantially cancel the magnetic field defined by the permanent magnets when energised.

11. The hydraulic shock absorber according to claim 1, wherein the damping characteristics of the shock absorber are substantially unaffected by a change in the strength of control field.

12. The hydraulic shock absorber according to claim 1, wherein the electro-rheological or magneto-rheological liquid in a damping region of the shock absorber is substantially unaffected by the control field.

13. The hydraulic shock absorber according to claim 1, wherein the seal is arranged to inhibit passage of the shock absorber fluid beyond the seal and out of the shock absorber.

14. An aircraft assembly including a shock absorber, the shock absorber comprising:
an inner housing portion slidably coupled to an outer housing portion to define a variable size chamber for containing shock absorber fluid, the region where the inner and outer housing portions overlap defining an annulus between adjacent surfaces of the inner and outer housing portions which varies in size in accordance with the extension state of the shock absorber; and
a seal located within the annulus and arranged in contact with one of the inner and outer housing portions for confining shock absorber fluid to the chamber;
wherein the shock absorber fluid comprises an electro-rheological or magneto-rheological liquid and the shock absorber includes a device for generating a magnetic or electric control field in the region of the seal in order to increase the viscosity of the shock absorber fluid such that the fluid in the region of the seal changes from a liquid state to a gel-like or solid state to inhibit passage of the shock absorber fluid beyond the seal; and
wherein the control field is stronger in a region of the electro-rheological or magneto-rheological liquid relatively near the seal than in a region of the electro-rheological or magneto-rheological liquid relatively far from the seal.

15. The aircraft assembly according to claim 14, wherein the aircraft assembly comprises an aircraft landing gear assembly.

16. A hydraulic shock absorber comprising:
an inner housing portion slidably coupled to an outer housing portion to define a variable size chamber for containing shock absorber fluid, the region where the inner and outer housing portions overlap defining an annulus between adjacent surfaces of the inner and outer housing portions which varies in size in accordance with the extension state of the shock absorber; and
a seal located within the annulus and arranged in contact with one of the inner and outer housing portions for confining shock absorber fluid to the chamber;
wherein the shock absorber fluid comprises an electro-rheological or magneto-rheological liquid and the shock absorber includes a device for generating a magnetic or electric control field in the region of the seal in order to increase the viscosity of the shock absorber fluid such that the fluid in the region of the seal changes from a liquid state to a gel-like or solid state to inhibit passage of the shock absorber fluid beyond the seal; and
wherein the damping characteristics of the shock absorber are substantially unaffected by a change in the strength of control field.

17. A hydraulic shock absorber comprising:
an inner housing portion slidably coupled to an outer housing portion to define a variable size chamber for containing shock absorber fluid, the region where the inner and outer housing portions overlap defining an annulus between adjacent surfaces of the inner and outer housing portions which varies in size in accordance with the extension state of the shock absorber; and
a seal located within the annulus and arranged in contact with one of the inner and outer housing portions for confining shock absorber fluid to the chamber;
wherein the shock absorber fluid comprises an electro-rheological or magneto-rheological liquid and the shock absorber includes a device for generating a magnetic or electric control field in the region of the seal in order to increase the viscosity of the shock absorber fluid such that the fluid in the region of the seal changes from a liquid state to a gel-like or solid state to inhibit passage of the shock absorber fluid beyond the seal; and
wherein the electro-rheological or magneto-rheological liquid in a damping region of the shock absorber is substantially unaffected by the control field.

* * * * *